United States Patent [19]
Delpla

[11] 3,929,283
[45] Dec. 30, 1975

[54] THERMOSTATIC MIXING APPARATUS AND A RELATED METHOD FOR REGULATING TEMPERATURE

[75] Inventor: Claude Delpla, Reims, France

[73] Assignee: Societe Generale de Fonderie, Paris, France

[22] Filed: May 23, 1974

[21] Appl. No.: 472,849

[30] Foreign Application Priority Data
Nov. 13, 1973 France .................. 73.40290

[52] U.S. Cl. .................................. 236/12 R
[51] Int. Cl.² .................................. G05D 11/16
[58] Field of Search ............. 236/12 R; 137/90

[56] References Cited
UNITED STATES PATENTS
1,156,505  10/1915  Stern ...................... 236/12
3,112,879  12/1963  Killias .................... 236/12

*Primary Examiner*—William E. Wayner
*Attorney, Agent, or Firm*—Young & Thompson

[57] ABSTRACT

The thermostatic mixing apparatus comprises a substantially cylindrical body having two inlets which open respectively into a cold-water admission chamber and a hot-water admission chamber, a mixing chamber within the body, a thermostatic cell for regulating the temperature of the mixture and means for controlling the outflow rate. The apparatus comprises a delivery chamber in communication with the mixing chamber and adjustable means for introducing either or both of the feed water streams directly into the delivery chamber.

9 Claims, 15 Drawing Figures

THERMOSTATIC MIXING APPARATUS AND A RELATED METHOD FOR REGULATING TEMPERATURE

This invention relates to a thermostatic mixing apparatus which is primarily intended to be employed in sanitary installations such as bath and shower systems as well as to a method for regulating the temperature of the mixed liquid delivered by said apparatus.

In more exact terms but not in any limiting sense, the invention is directed to an apparatus for mixing hot and cold water, of the type comprising members for controlling and regulating the temperature of the mixture as well as manual operating members for controlling the outflow rate. The blended water can be supplied in particular to the spout of a bath tap (faucet) or to a shower feed pipe.

This is in fact the most common application of the apparatus and the method contemplated by the invention but it is readily apparent that both the apparatus and the method could equally well be employed in other fields of utilization in which similar operating conditions are required.

Many thermostatic mixing units are already known, one noteworthy example being the tap described in French Pat. No. 71,40,986.

Mixing taps or faucets are complex mechanisms by reason of the fact that the temperature-regulating knob or lever is intended to displace the thermostatic element. This type of mechanism gives rise to operating forces which are relatively inconstant and frequently of high value. In regard to the calibration of these mixing units over a range of temperatures extending from cold water to hot water, this remains a difficult and relatively imprecise operation in the case of blended-water temperatures in the vicinity of either cold water or hot water. The defect just mentioned is aggravated even further as soon as the supply pressures are out of balance as is often the case in users' installations.

The aim of the invention is to overcome the abovementioned disadvantages by making it possible to produce a mixing apparatus of relatively simple structural design in which the blended water delivered at the outlet of the apparatus remains at a stable temperature in spite of the variations in pressure and temperature of the feed water.

The thermostatic mixing apparatus contemplated by the invention is primarily intended for use in sanitary installations and comprises a substantially cylindrical body having two inlets which open respectively into a cold-water admission chamber and a hot-water admission chamber and containing a mixing chamber which opens into an outlet for the discharge of blended water, means comprising a thermostatic cell for regulating the temperature of the mixture and means for controlling the outflow rate.

In accordance with the invention, said apparatus essentially comprises a delivery chamber in communication with the mixing chamber and adjustable means for introducing either or both of the feed water streams directly into said delivery chamber.

Since the thermostatic mechanism is preset for a predetermined temperature of the blended water, the addition of hot water or cold water directly within the delivery chamber in order to obtain the desired temperature makes it unnecessary for the user to perform any manual adjustment on the thermostatic mechanism.

It is thus possible to obtain utilization temperatures over a sufficiently wide range while at the same time entailing the need for good sensitivity and good fidelity of response of the cell only over a relatively narrow range including the temperature chosen for the presetting.

The method which also forms the subject of the invention for regulating the temperature of the blended water in a thermostatic mixing apparatus such as an apparatus of the type aforesaid essentially consists in presetting the temperature of the blended water in a mixing chamber at a predetermined value, in adjusting the temperature of said blended water to the desired temperature by introducing additional hot water or cold water directly within a delivery chamber which communicates with the mixing chamber.

Since the usual range of temperatures in a bath or a shower system is limited in practice in the majority of cases to values comprised between approximately 30° and 45°, this method makes it possible to choose conveniently any temperature within this range of values.

In a first form of construction of the mixing apparatus according to the invention, the chamber for the delivery of blended water is connected to pipes for the additional admission of hot water and cold water within the delivery chamber, said pipes being fitted with control knobs for regulating the rates of flow of hot and cold water.

The apparatus thus has three control knobs, namely a knob for regulating the rate of flow of blended water at the outlet of the mixing chamber and two control knobs which serve to regulate the additional flow rates of hot and cold water for adjusting the blended water to the exact desired temperature (the two control knobs just mentioned have a negligible influence on the overall rate of flow).

In a second advantageous form of construction in which provision is made for a rotatable bush mounted in coaxial relation to the tap body so as to define the mixing chamber and provided with ports for the admission of feed water into the mixing chamber, the bush is adapted to carry a cover pierced by a central hole and forming a partitionwall between the mixing chamber and the chamber for the delivery of blended water, and longitudinal gaps for the admission of hot water and cold water directly from the inlets in the delivery chamber are formed in the bush.

In this embodiment of the invention, the delivery chamber is directly adjacent to the mixing chamber within the tap body itself. Said body is thus designed in a more compact manner and only has two control knobs, namely a knob for regulating the temperature of the blended water, and a flow-regulating control knob which can be mounted, for example, on a connecting pipe between the delivery chamber and a discharge spout.

Further properties and advantages of the invention will become apparent from the detailed description which now follows.

A number of embodiments of the invention are illustrated in the accompanying drawings which are given by way of example without any limitation being implied, and in which.

Figures 1, 2:
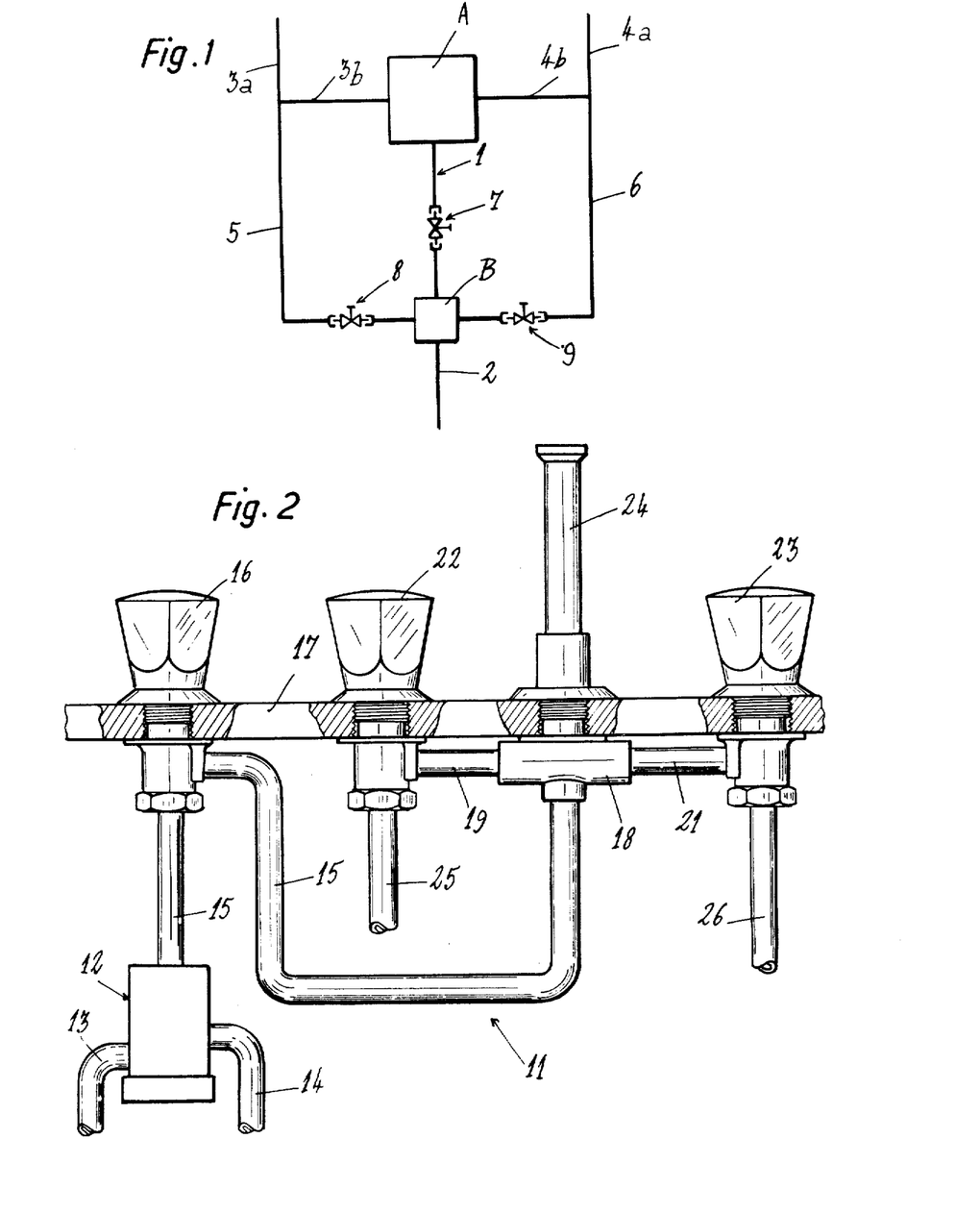
FIG. 1 is a diagram illustrating the method and the mixing apparatus in accordance with the invention.
FIG. 2 is a view in elevation with part-sectional portions showing a first industrial embodiment of the apparatus in accordance with the invention.

Referring to FIG. 1 which provides a schematic illustration of a thermostatic mixing apparatus and related method in accordance with the invention, it is apparent that the apparatus comprises a chamber A for mixing hot water and cold water, said chamber being connected by means of a pipe 1 to a chamber B for the delivery of blended water.

Said chamber B discharges into a delivery pipe 2 whilst the mixing chamber A is supplied with cold water and hot water via pipes 3a, 3b and 4a, 4b. Pipes 5, 6 are branched off these latter for supplying the delivery chamber B with hot water and cold water directly from the pipes 3a, 4a.

A control valve 7 inserted in the connecting-pipe 1 serves to regulate the flow rate of blended water discharged from the chamber A whilst control valves 8, 9 are mounted in the pipes 5, 6 for regulating the direct admission of feed water into the delivery chamber B.

The method according to the invention for regulating the temperature of the blended water can readily be understood:

The temperature of the mixed water within the chamber A is preset by means of the thermostatic system at a value selected by the user such as 37°, for example, and the rate of flow of said water is adjusted by means of the control valve 7.

If the temperature of the blended water which is admitted into the delivery chamber B does not quite meet the user's requirements, the user can adjust this temperature to the desired value by opening either of the two control valves 8, 9.

Said control valves are so arranged as to ensure that the addition of either hot or cold feed water to the blended water of the delivery chamber B does not appreciably modify the overall flow rate of the blended water which is discharged through the pipe 2.

There is thus no need for the user to carry out any manual operation on the thermostatic system of the chamber A. The range of temperatures can be determined by design of the control valves 8, 9. In practice, a temperature range extending from 6 to 7 degrees on each side of the preset temperature within the mixing chamber A has been considered as wholly satisfactory and sufficient for the great majority of users.

In point of fact, blended-water temperatures having values close to those of very hot water and cold water are rarely selected for a shower or a bath, with the result that mean temperatures within the range of approximately 30° to 45° satisfies the requirements of most users in actual practice.

Figure 3:
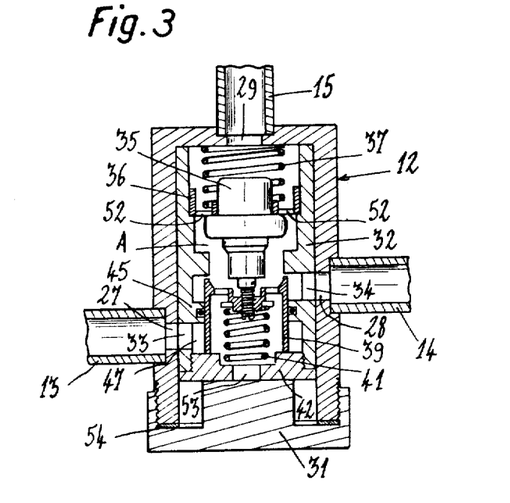
FIG. 3 is an axial sectional view showing the mixing chamber in the tap of FIG. 1, there being also shown in this figure the thermostatic regulating system and the rotatable bush.
Figure 4:
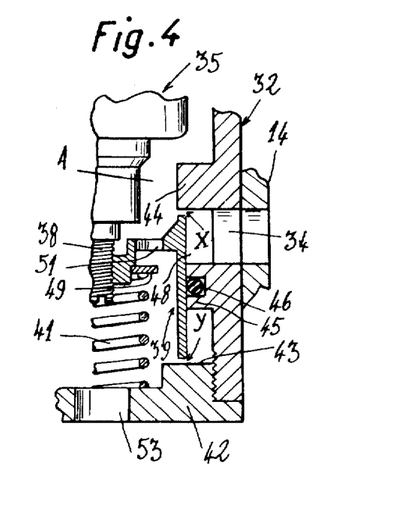
FIG. 4 is a fragmentary sectional view to a larger scale with cutaway portions and similar to FIG. 3.

Referring to FIGS. 2 to 4, there will now be described a first industrial embodiment of the mixing apparatus in accordance with the invention.

The apparatus 11 which is shown generally in FIG. 2 is intended to be fitted in a sanitary installation such as a bath or shower system. Said apparatus comprises a substantially cylindrical body 12 into which open two pipes 14, 13 for the admission of cold water and hot water respectively, said pipes being intended to communicate with a connecting-pipe 15 for evacuation of the blended water. A stop-cock 16 mounted on a support 17 and placed in the connecting-pipe 15 serves to regulate the flow rate of blended water which is supplied from the mixing chamber contained in the body 12.

In accordance with the invention, the pipe 15 communicates with a delivery chamber formed within a T-union 18 forcibly fitted on the one hand on the connecting-pipe 15 and on the other hand on the pipes 19, 21 which provide a connection with cocks 22, 23 for the introduction of hot water and cold water into the T-union 18. Said union communicates with a discharge spout 24 which is screwed into the support 17.

In the embodiment which is illustrated in FIG. 2, the cocks 22, 23 are similar to the flow-control cock 16 and are also mounted on the support 17. Said cocks are connected respectively to the pipes 13, 14 by means of pipes 25, 26.

Referring now to FIGS. 3 and 4, it is apparent that the cylindrical body 12 has two inlets 27, 28 located opposite to the hot-water admission pipe 13 and the cold-water admission pipe 14 and an outlet 29 for the discharge of blended water which is located opposite to the pipe 15.

An internally threaded end-cap 31 covers the extremity of the body 12 which is remote from the discharge outlet 29.

The body 12 contains a coaxial bush 32 in which are formed ports 33, 34 at the level of the inlets 27, 28 for the admission of feed water. The bush 32 defines an internal mixing chamber A which opens into the outlet pipe 15 and within which is mounted axially a thermostatic cell 35 of known type.

Said cell is so arranged as to bear on a ring 36 supported by an annular shoulder of the bush 32 and on a spring 37 which is coaxial with the discharge outlet 29 and is applied against the body 12. In addition, the end of the cell 35 which is remote from the discharge outlet 29 is applied against an axial screw 38 engaged in a slide-valve 39. This latter is acted upon by a spring 41 which is coaxial with the body 12, said spring being supported on a threaded cover 42 which is interposed between the end-cap 31 and the bush 32. The corresponding end portion of the bush 32 is provided with an internal screw-thread and screwed onto the cover 42 in which is formed a central hole 53.

The slide-valve 39 has a cylindrical contour and is mounted with a suitable clearance between an annular shoulder 43 of the cover 42 and a corresponding annular projection 44 of the bush 32 (as shown in particular in FIG. 4). The slide-valve 39 is also in sliding contact with a central annular flange 45 of the bush 32, an O-ring seal 46 being fitted in said annular flange, the edge of which is slightly set back with respect to the projection 44 and with respect to the annular shoulder 43.

On the side nearest the admission pipe 13, the annular flange 45 defines an annular admission chamber 47 with the annular shoulder 43 of the cover 42 and the slide-valve 39. On the side nearest the pipe 14, the annular flange 45 defines a second annular admission chamber 48 with the annular projection 44 and the slide-valve 39.

Said slide-valve is adapted to carry a central washer 49 to which is applied the force of the spring 41 for balancing the thermostatic cell 35. Ports 51 formed in the slide-valve 39 near the washer 49 as well as apertures 52 which are pierced annularly in the ring 36 serve to fill the entire mixing chamber A with blended water.

It is readily apparent that the washer 49 is placed at a sufficient distance from the ports 51 to ensure that these latter are not covered and that a sufficient passage is allowed for the circulation of the water which is supplied through the pipe 13.

A flat annular seal 34 interposed between the body 12 and the end-cap 31 maintains leak-tightness between these two elements.

The thermostatic regulating system operates in the following manner:

In order to preset the temperature of the blended water within the chamber A at the desired value - for example 37 degrees as indicated earlier - the end-cap 31 is unscrewed, the adjusting screw 38 is rotated either in one direction or in the other by means of a screwdriver which is passed through the central hole 53 of the cover 42.

This operation has the effect of moving the slide-valve 39 either towards or away from the cell 35 and consequently adjusts its position relatively to the projection 44 and to the annular shoulder 43 which limit the travel of the slide-valve 39. This position of the slide-valve 39 determines the widths of annular gaps X, Y for the admission of hot and cold feed water streams into the mixing chamber A and consequently the ratio of quantity of hot water to quantity of cold water, that is to say the temperature of the blended water.

The cold and hot streams penetrate into the mixing chamber A through the annular gaps X, Y. The water which issues from the pipe 13 and passes through the gap Y fills the slide-valve 39, then flows into the mixing chamber A proper via the ports 51 and is intimately mixed within said chamber with the water which has passed through the gap X. The mixture then passes through the apertures 52 of the ring 36 and flows through the outlet pipe 15.

If the temperature of the mixture rises as a result of an increase in pressure or in temperature of the hot water, the thermostatic cell 35 expands. While being supported on the ring 36, said cell thrusts back the slide-valve 39 towards the cover 42. In consequence, the width of the gap Y for the admission of hot water decreases whilst the width of the gap X for the admission of cold water increases, thereby restoring the temperature of the blended water to the preset value.

A reduction in temperature of the blended water gives rise in a reverse process to an increase in width of the gap Y and a decrease in the width of the gap X which maintain the temperature at the initially set value.

Figure 5:
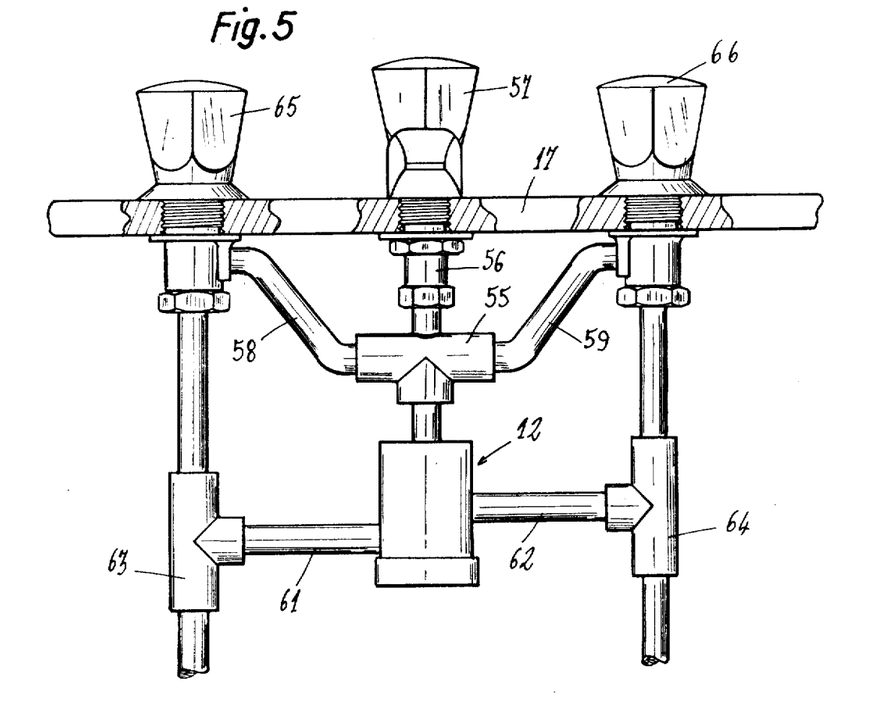
FIG. 5 is a view in elevation with part-sectional portions showing a second industrial embodiment of the mixing apparatus in accordance with the invention.

In the version of the mixing apparatus in accordance with the invention which is illustrated in FIG. 5, the body 12 containing the thermostatic mechanism is connected directly to a T-union 55 which constitutes the blended-water delivery chamber. The blended water is discharged from the T-union 55 through a short length of connecting-pipe 56 terminating in a discharge spout which is not visible in the figure whilst the rate of outflow of blended water can be regulated by means of a tap 57.

Two pipes 58, 59 for the direct addition of hot and cold water within the delivery chamber also open into the T-union 55. Said pipes 58, 59 are connected to the inlet ducts 61, 62 for admission of water into the body 12 by means of T-unions 63, 64 and with interposition of cocks 65, 66 for regulating the rates of flow of additional water. In this version of the apparatus, the flow rate of blended water is regulated by means of the tap 57 and the temperature is adjusted by means of either of the two additional regulating cocks 65, 66 but this adjustment does not result in any appreciable modification of the outflow rate.

In the embodiment of the invention which is illustrated in FIGS. 6 to 9, the mixing chamber A and blended-water delivery chamber C are both arranged within the interior of the body 10 of the apparatus which is thus designed in the form of a compact mixing tap.

Figure 6:
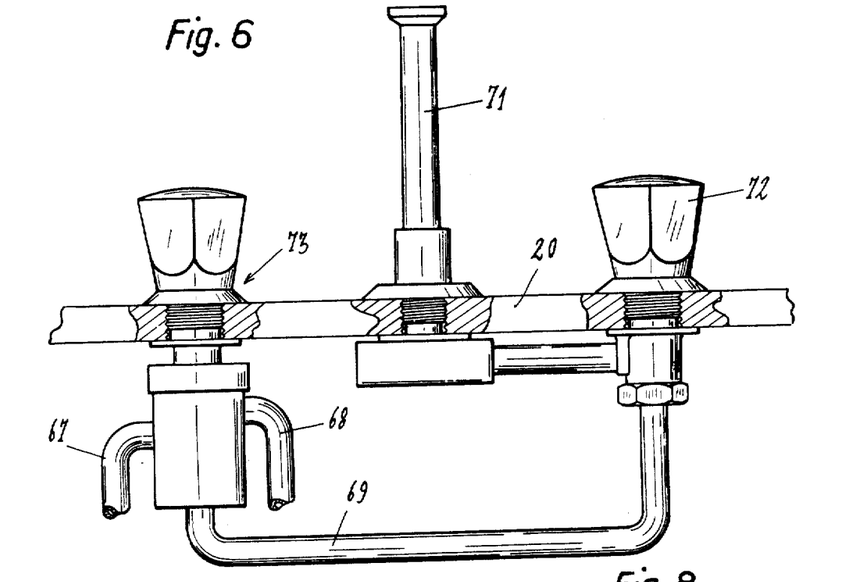
FIG. 6 is a view in elevation showing a third industrial embodiment of the mixing apparatus in accordance with the invention.

The admission pipes 67, 68 open into the body 10 from which extends an outlet pipe 69 and this latter terminates in a discharge spout 71 mounted on the support 20, a flow-regulating cock 72 being fixed on the support and interposed between the body 10 and the discharge spout 71.

Fine adjustment of the temperature of the blended water which flows through the pipe 69 can be ensured by means of a control knob 73 fixed on the support 20.

The bush 74 (shown in FIGS. 7 and 8) is adapted to carry a cover 75 which is pierced by a central hole 76 and forms a partition-wall between the mixing chamber A and the blended-water delivery chamber C which communicates with the outlet pipe 69. Longitudinal gaps 77, 78 are formed in the bush 74 in order that either of the inlets 79, 81 may be put into communication with the delivery chamber C by rotation of the bush 74.

Figure 7:
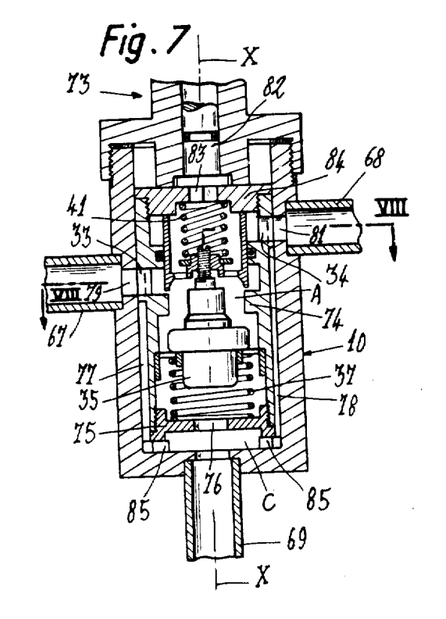
FIG. 7 is a sectional view which is similar to FIG. 3 and shows the mixing chamber of the tap of FIG. 6.

To this end, said bush is rotationally coupled with the knob 73 for regulating the temperature of the blended water by means of a shaft 82 which is coaxial with the control knob 73 and has a prismatic extremity 83 for the purpose of forcible engagement in a cap 84 which is screwed into the bush 74.

Figure 9:
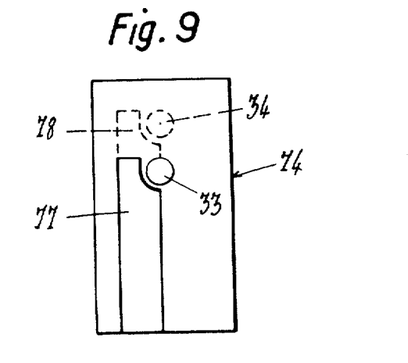
FIG. 9 is a partial view in elevation showing the rotatable bush of the embodiment of FIG. 7.

The gaps 77, 78 are formed in the vicinity of the admission ports 33, 34 of the bush 74 in order to ensure that the communication established between said gaps and the inlets 79, 81 of the body 10 does not interrupt the supply of either hot or cold water. Assuming that the axis X—X of the body 10 is vertical, the extremities of the gaps 77, 78 are located at the top level of the ports 33, 34 respectively (as shown in FIG. 9).

Castellated recesses 85 formed in the cover 75 of the bush 74 provide a connection between the gaps 77, 78 and the delivery chamber C.

The coaxial springs 37, 41 which are applied respectively against the cover 75 and the cap 84 maintain the thermostatic cell 35 in equilibrium within the mixing chamber A in the same manner as the embodiment shown in FIGS. 3 and 4.

The operation of this form of construction of the mixing apparatus in accordance with the invention can readily be understood as will now be explained.

Figure 8:
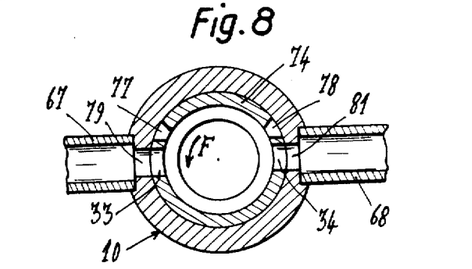
FIG. 8 is a transverse sectional view taken along line VIII—VIII of FIG. 7.

By rotation of the bush 74 by means of the knob 73 in the direction of the arrow F (as shown in FIG. 8), the cold-water inlet 79 can be caused to communicate partially with the gap 77.

The water accordingly flows through the gap 77, then into the delivery chamber C after having passed through the castellated recesses 85, mixes with the blended water which comes from the mixing chamber A, the two types of water being then evacuated towards the discharge spout 71 via the outlet pipe 69.

A rotation of the bush 74 in the direction opposite to that of the arrow F permits a similar introduction of water into the delivery chamber C through the gap 78.

This embodiment has an advantage over the previous forms of construction in that it comprises only two regulating members, namely the knob 73 for controlling the temperature and the cock 72 for controlling the rate of flow.

In the version illustrated in FIGS. 10 to 13, the mixing apparatus is also of compact design and constitutes a tap or faucet comprising a body 86 which contains the mixing chamber A and delivery chamber D, and a single control knob 87 for adjusting the flow rate and the temperature of the blended water, said control knob being mounted on the support 30. Both the hot and cold water penetrate into the body 86 via pipes 88, 89 and the blended water passes out of said body via a connecting-pipe 91 extending to a pipe 92 which is fixed on the support 30 and terminates in a discharge spout (not shown in the figure).

Figure 11:
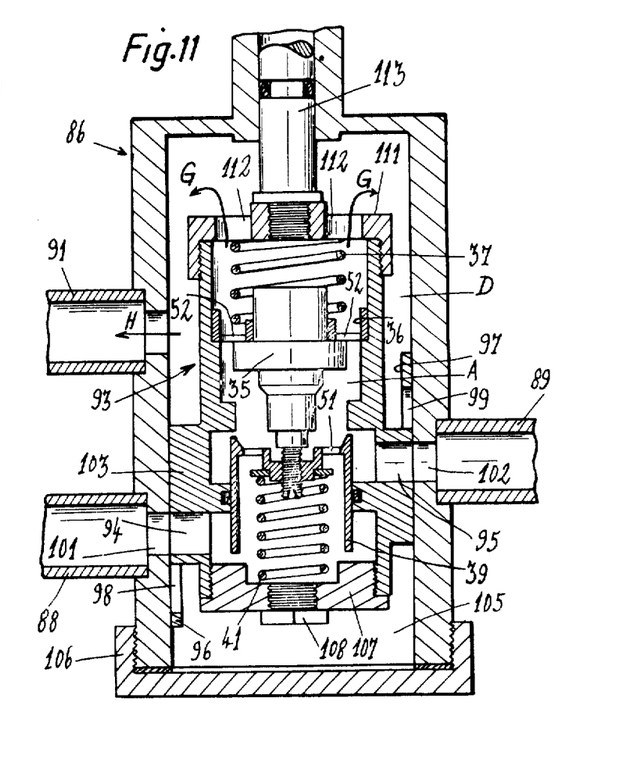
FIG. 11 is an axial sectional view which is similar to FIG. 3 but drawn to a larger scale and showing the body of the apparatus of FIG. 10.

The mechanism for regulating the temperature of the blended water is constituted as follows:

The bush 93 is so arranged as to form a partition-wall between the central mixing chamber A and a delivery chamber D which is concentric with the chamber A, the chamber D being formed between the bush 93 and the tap body 86.

The bush 93 is provided on each side of its admission ports 94, 95 with peripheral lugs 96, 97 which are in contact with the internal wall of the body 86. There are formed in the lugs 96, 97 drilled holes 98, 99 which are adjacent to the ports 94, 95 for the admission of feed water.

Figure 12:
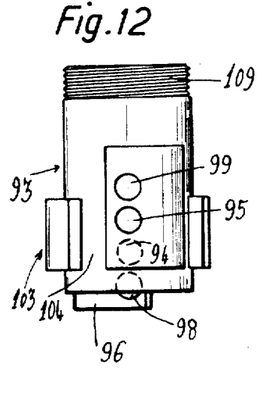
FIG. 12 is a view in elevation of the rotatable bush shown in FIG. 11.
Figure 13:
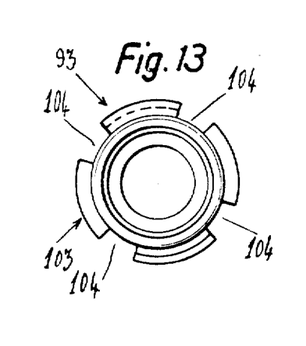
FIG. 13 is a plan view of the bush shown in FIG. 12.

The bush 93 is provided opposite to the inlets 101, 102 of the body 86 with an annular projecting portion 103 in which are pierced the ports 94, 95 and which has longitudinal grooves 104 (the groove 104 which is adjacent to the drilled hole 99 is visible in FIG. 12).

By means of said grooves 104, an end chamber 105 into which opens the drilled hole 98 is put into communication with the delivery chamber D. The end chamber 105 is defined on one side by a closure end-cap 106 which is screwed onto the extremity of the body 86 and on the other side by an externally threaded cover 107 which is screwed into the bush 93.

The threaded cover 107 has a central hole which is intended to permit positional adjustment of the slide-valve 39 in much the same manner as in the embodiments of FIGS. 3 and 7. Said hole is sealed by means of a bolt 108 which thus closes the mixing chamber A on this side.

The end of the bush 93 which is remote from the cover 107 has a threaded portion 109 on which is screwed a head-piece 111 provided with ports 112 for the passage of blended water from the mixing chamber A towards the annular delivery chamber D.

An axial operating rod 113 engaged in the head-piece 111 couples this latter and the bush 93 to the control knob 87 for both rotational motion and axial translational motion.

The water which is present within the chamber A at a preset temperature passes through the ports 112 into the delivery chamber D (arrows G) before flowing through the outlet pipe 91 (arrow H).

It is only necessary to lift the operating rod 113 by means of the control knob 87 in order to establish either partial or total communication between the drilled hole 98 and the hot-water inlet 101. The hot water accordingly enters the drilled hole 98, then flows through the chamber 105 and the grooves 104 into the delivery chamber D in which said hot water mixes with the blended water supplied from the chamber A.

The reverse operation which consists in displacing the operating rod 113 downwards within the body 86 puts the drilled hole 99 into communication with the inlet 102 for the admission of cold water which passes directly into the delivery chamber D.

The precise adjustment of the bush 93 within the body 86 makes it possible by rotating the operating rod 113 to close-off the inlets 101, 102 in a progressive manner and consequently to regulate the discharge rate of the tap.

This mode of construction of the mixing apparatus in accordance with the invention is particularly convenient and advantageous for the user since the same control knob 87 serves to regulate both the outflow rate and the temperature of the blended water by means of the two degrees of freedom of the bush 93.

Figure 10:
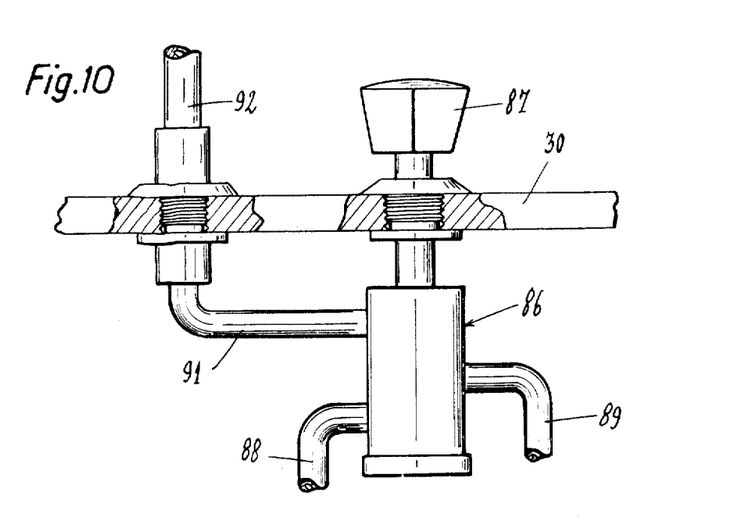
FIG. 10 is a view in elevation showing a fourth embodiment of the apparatus in accordance with the invention.
Figures 14, 15:
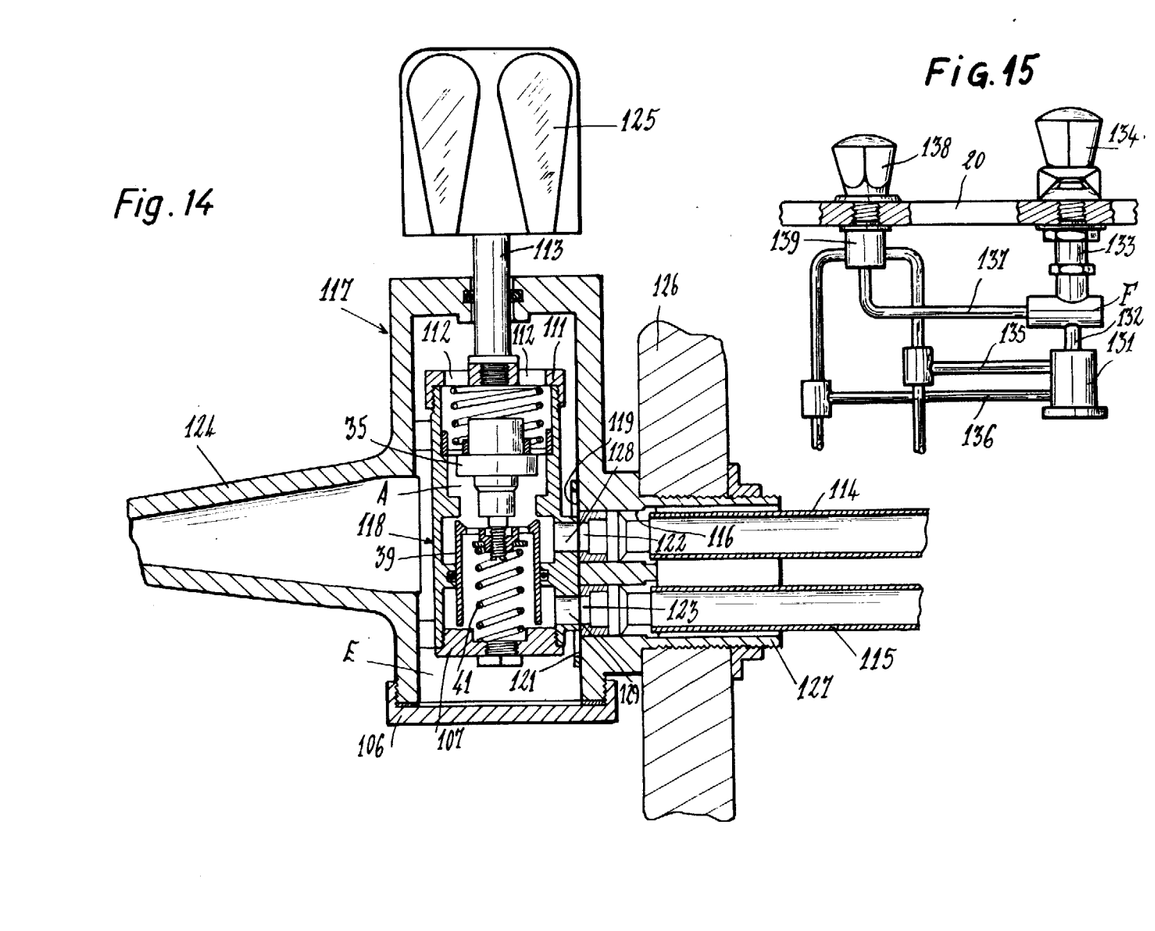
FIG. 14 is a large-scale axial sectional view of a fifth industrial embodiment of the mixing apparatus in accordance with the invention.
FIG. 15 is a view in elevation showing a sixth industrial embodiment of the apparatus in accordance with the invention.

FIG. 14 illustrates a design which is similar to that of FIG. 10 but more compact. The two admission pipes 114, 115 are set close together and forcibly fitted through a support 126 into a common opening 116 of the tap body 117. The bush 118 is provided with drilled holes 119, 121 which are similar to the drilled holes 98, 99 of FIG. 11 and formed on each side of the ports 128, 129.

The delivery chamber E completely surrounds the mixing chamber A located inside the bush 118 and communicates directly with a discharge spout 124 which is formed in one piece with the tap body 117. Said body has a cylindrical threaded portion 127 which is screwed in position through the support 126 and in which the admission pipes 114, 115 are engaged. An operating knob 125 which is similar to the knob 87 of FIG. 10 serves to regulate the flow rate and temperature of the blended water.

Under operating conditions, the support 126 is practically horizontal and the discharge spout 124 has a curved end portion which is not shown in the figure.

In the industrial embodiment of FIG. 15, the delivery chamber F is formed within a sleeve which is separate from the body 131 to which said chamber is connected by means of a pipe 132. The chamber F is also connected to an outlet pipe 133 fitted with a flow-regulating knob 134 and to the pipes (135, 136) for the admission of cold water and hot water into the body 131 through a connecting-pipe 137 which is branched on said pipes 135, 136 by means of a three-way valve 139. The operating knob 134 is mounted on the support 20 and the connecting-pipe 137 is provided with a knob 138 for regulating the rate of flow of hot water and cold water, said knob being mounted on the support 20.

The invention is not limited to the various embodiments described in the foregoing and may be extended to alternative modes of execution. Thus, in the embodiments of FIGS. 11 and 14, the mechanism which is mounted within the body 86, 117 can readily be modified in such a manner as to regulate the temperature of the blended water by rotation of the bush 93, 118 and its rate of flow can be modified by displacing the bush in translational motion. In the embodiments shown in FIGS. 2 to 5, the bush 32 can be constructed in one piece with the body 12. In the embodiment of FIG. 7, the gaps 77, 78 can be formed in the body 10, in which case an admission port is formed in the bush in the vicinity of each gap. Similarly, the castellated recesses 85 can be formed in the body 10 whilst the entire periphery of the cover of the bush 74 is extended to the body 10.

What we claim is:

1. A thermostatic mixing apparatus primarily intended for use in sanitary installations, comprising a body having two inlets which open respectively into a cold-water admission chamber and a hot-water admission chamber and containing a mixing chamber which opens into an outlet for the discharge of blended water, means comprising a thermostatic cell for regulating the temperature of the mixture and means for controlling the outflow rate, wherein said apparatus comprises a delivery chamber in communication with the mixing chamber and adjustable means for introducing either of the feed water streams directly into said delivery chamber, said body being cylindrical, and a bush mounted in coaxial relation to the body so as to define the mixing chamber and provided with ports for the admission of feed water into the mixing chamber, wherein the bush is adapted to carry a cover pierced by a hole and forming a partition-wall between the mixing chamber and the chamber for the delivery of blended water, and wherein longitudinal gaps for the admission of hot water and cold water directly from the inlets into the delivery chamber are formed in the bush.

2. An apparatus according to claim 1, wherein castellated recesses providing a connection between the gaps and the delivery chamber are arranged in the cover of the bush.

3. An apparatus according to claim 1, wherein means are provided for rigidly coupling the bush for rotation with a control knob for regulating the temperature of the blended water.

4. An apparatus according to claim 1, wherein the gaps of the bush are formed in the vicinity of the ports for admission of feed water.

5. An apparatus according to claim 1, wherein the delivery chamber is connected to a discharge spout through a pipe in which is mounted a control knob for regulating the rate of flow of blended water.

6. A thermostatic mixing apparatus primarily intended for use in sanitary installations, comprising a body having two inlets which open respectively into a cold-water admission chamber and a hot-water admission chamber and containing a mixing chamber which opens into an outlet for the discharge of blended water, means comprising a thermostatic cell for regulating the temperature of the mixture and means for controlling the outflow rate, wherein said apparatus comprises a delivery chamber in communication with the mixing chamber, a bush mounted in coaxial relation to the tap body so as to define the mixing chamber and provided with ports for the admission of feed water into the mixing chamber, wherein the bush forms a partition wall between the mixing chamber and the blended-water delivery chamber which is formed between the bush and the tap body, wherein peripheral drilled holes open into the delivery chamber and are formed in the bush in the vicinity of its ports for the admission of the feed water and wherein means are provided for displacing the bush axially and in rotation.

7. An apparatus according to claim 6, wherein the bush is provided opposite the inlets of the body with an annular projection in which are formed longtiudinal grooves for putting the drilled holes into communication with the blended-water delivery chamber.

8. An apparatus according to claim 7, wherein the bush is coupled for translational and rotational motion with an operating rod attached to a control knob for regulating the rate of flow and the temperature of the blended water.

9. A thermostatic mixing apparatus primarily intended for use in sanitary installations, comprising a body having two inlets which open respectively into a cold-water admission chamber and a hot-water admission chamber and containing a mixing chamber which opens into an outlet for the discharge of blended water, means comprising a thermostatic cell for regulating the temperature of the mixture and means for controlling the outflow rate, wherein said apparatus comprises a delivery chamber in communication with the mixing chamber and adjustable means for introducing either of the feed water streams directly into said delivery chamber, said body being cylindrical, and a bush mounted in coaxial relation to the body so as to define the mixing chamber and provided with ports for the admission of feed water into the mixing chamber, wherein the bush is adapted to carry a cover pierced by a hole and forming a partition-wall between the mixing chamber and the chamber for the delivery of blended water, and wherein longitudinal gaps for the admission of hot water and cold water directly from the inlets into the delivery chamber are formed in the body.

* * * * *